United States Patent [19]

Balducci et al.

[11] Patent Number: 5,270,027

[45] Date of Patent: Dec. 14, 1993

[54] PROCESS OF PREPARING HIGH-POROSITY SILICA XEROGELS USING ALKANOLAMINES

[75] Inventors: Luigi Balducci, Pavia; Franco Montino, Novara; Guido Cogliati, Rome, all of Italy

[73] Assignee: Istituto Guido Donegani S.P.A., Novara, Italy

[21] Appl. No.: 960,829

[22] Filed: Oct. 14, 1992

[30] Foreign Application Priority Data

Oct. 17, 1991 [IT] Italy ................. MI.91-A/002741

[51] Int. Cl.$^5$ ......................... C01B 33/16
[52] U.S. Cl. ................. 423/338; 252/315.6; 65/18.3; 501/12; 502/233
[58] Field of Search .......... 423/338; 252/315.6; 501/12; 65/18.3, 18.4; 502/233

[56] References Cited

U.S. PATENT DOCUMENTS

| | | | |
|---|---|---|---|
| 4,152,503 | 5/1979 | Short et al. | 526/106 |
| 4,775,520 | 10/1988 | Unger et al. | 423/335 |
| 4,776,867 | 10/1988 | Onorato et al. | 65/18.1 |
| 5,207,814 | 5/1993 | Cogliati et al. | 65/18.3 |

FOREIGN PATENT DOCUMENTS

| | | |
|---|---|---|
| 0298062 | 1/1989 | European Pat. Off. . |
| 3307126 | 12/1988 | Japan ................. 423/338 |
| 2170189 | 7/1986 | United Kingdom . |

OTHER PUBLICATIONS

Chemical Abstracts, vol. 113, No. 6, Aug. 6, 1990, AN 43387a, p. 154, and JP-A-02-111-616, Apr. 24, 1990, "Preparation of Silica Gel With High Surface Area".
Chemical Abstracts, vol. 114, No. 8, Feb. 25, 1991, AN 65298v, p. 184, and JP-A-02-255-517, Oct. 16, 1990, "Manufacture of Silica Particles".

*Primary Examiner*—Olik Chaudhuri
*Assistant Examiner*—Ken Horten
*Attorney, Agent, or Firm*—Oblon, Spivak, McClelland, Maier & Neustadt

[57] ABSTRACT

The invention relates to high-porosity silica xerogels and a process for their preparation consisting of subjecting silica alcogels to thermal treatment in the presence of organic compounds containing amino and hydroxyl groups.

The xerogels are characterised by a total pore volume $\geq 2$ cc/g and a mean pore diameter $\geq 100$ Å.

6 Claims, 1 Drawing Sheet

PROCESS OF PREPARING HIGH-POROSITY SILICA XEROGELS USING ALKANOLAMINES

FIELD OF THE INVENTION

This invention relates to silica xerogels characterised by high porosity and controlled pore diameter distribution. Such products are used in numerous sectors of industry as absorbents, fillers, supports for catalyst and/or other metal systems, reinforcing agents, thickeners, thixotropic agents in pigments or paints, heat and/or sound insulants and for other purposes.

As is well known, the term "gel" indicates a highly porous semi-rigid colloidal system in which the liquid medium (such as water or alcohol) has been adsorbed by the "sol" particles combined into filiform aggregates linked together.

Removing the interstitial liquid from the porous gel structure by the traditional method of drying generally leads to a reduction in pore volume. The reasons for this reduction are related to capillary phenomena, in that the capillary forces which gradually originate within the porous structure as the liquid front withdraws from the gel by evaporation are sufficient to cause the porous structure to collapse.

DESCRIPTION OF THE RELATED ART

Various approaches have been followed to overcome or limit this phenomenon.

A classical method of eliminating the drawback is to evacuate the solvent under hypercritical T and P conditions in a pressure vessel, a method which was patented many years ago (U.S. Pat. Nos. 2,249,767; 2,188,007).

This method, suitably modified, is still used and enables gels (aerogels) to be obtained with high porosity. Examples of inorganic oxide aerogels, including silica, prepared by this method and used in the catalysis field are reported in the articles "Aerogel Catalyst" [Applied Catalysis 72 (1991), 217-266] and "Aerogel of inorganic oxides" [S. I. Teichner, Aerogels, Proceedings of the first International Symposium, Würzburg, Sept. 23-25 (1985)], and in U.S. Pat. No. 4,042,769 and EP 149816.

Removal of the liquid, normally methanol or ethanol, by this method requires a temperature ($>243°$ C.) and pressure ($>6.4$ MPa) such as to make the drying process costly and dangerous. Although the use of liquid carbon dioxide (U.S. Pat. No. 4,419,968) allows operation under temperature conditions ($\geq 32°$ C.) close to ambient temperature and results in less danger, it has certain drawbacks in that laborious washing of the silica gel is required.

For this reason, methods alternative to the aforesaid have been developed which even though they do not allow gels to be obtained with physical characteristics (surface area, pore dimensions, size distribution, apparent density etc.) equal to those of the aforesaid aerogels, they have enabled gels (xerogels, i.e. gels obtained by drying under non-hypercritical conditions) to be produced with increasingly better properties. For example, a very well known method (U.S. Pat. No. 3,652,214) used to avoid the presence of the liquid-vapour interface consists of solidifying the liquid (for example water) within the pores of the hydrogel and then subliming the solid under vacuum (freeze-drying). However, with this method the porosity of silica xerogels is lower than that of the corresponding aerogels [Journal Non Cryst. Solids 121 (1990), 66-67].

Another method which has given good results is to distill the water from the hydrogel pores in the presence of immiscible liquids able to form azeotropes (U.S. Pat. No. 3,652,216).

As the chemical (or physical) interaction of the liquid with the pore walls is one of the main causes of capillary forces, chemical approaches have also been proposed to limit these interactions [Journal Non Cryst. Solids 100 (1988), 61-62]. In this respect it is well known that the use of DCCAs (drying control chemical additives) such as glycerol reduce gel capillary forces as they are strongly adsorbed on the gel surface [Brinker, Scherer, "Sol-gel Science" Academic Press Inc. (1990), pages 500-501].

Thermal treatment of silica hydrogels with oxygen-containing organic compounds of the water-soluble polyfunctional alcohol class (such as glycols, polyethyleneglycols) is described for example in U.S. Pat. No. 4,169,926 for producing $SiO_2$ xerogels suitable as supports for olefin polymerization catalysts. Finally the thermal treatment of $SiO_2$ hydrogels in the presence of glycols and organic esters such as amyl acetate is described in U.S. Pat. No. 4,104,363.

However, according to the processes of the aforestated patents, even though xerogels with a satisfactory mean pore volume ($\geq 1.5$ cm$^2$/g) are obtained, nothing is said with regard to controlling their distribution within the xerogels.

SUMMARY OF THE INVENTION

The object of the present invention is therefore to overcome the aforestated drawbacks of the known art.

In this respect, within the context of thermal treatment of silica gels with organic compounds, a new class of oxygen and nitrogen containing compounds has been discovered, which enable silica xerogels to be obtained characterised by high pore volume. These compounds, compared with compounds known in the art, provide xerogels which are more porous or have a uniform pore size distribution, and allow operation at a lower temperature.

On the basis of the aforesaid, the present invention provides a process for preparing silica xerogels from alcogels, consisting of the following stages:

1) mixing a silica alcogel with at least one organic compound (I) containing hydroxyl groups able to reduce surface tension within the pores, to obtain an $SiO_2$-alcohol-(I) mixture (A);

2) removing the alcohol by distillation to obtain an $SiO_2$-I mixture (B);

3) thermal treatment at a temperature between 100° and 250° C. to obtain an $SiO_2$-I mixture (C) in which the hydroxyl groups of some molecules of (I) are esterified with the silanol groups (Si—OH) of the silica;

4) separating a large part of the organic compound (I) which has not reacted during the thermal treatment of stage 3), by filtration and repeated washing with an alcohol to obtain a xerogel (D) containing the molecules of (I) esterified during stage 3) plus that part of the wash alcohol which had remained adsorbed.

5) drying the product (D) from stage 4) to obtain a xerogel (D) free of adsorbed alcohol;

6) calcining the xerogel (D) from stage 5) in an oxidizing atmosphere at a temperature of between 400° and 600° C., the process being characterised in that the organic compound (I) consists of an alkanolamine pertaining to the group of general formula:

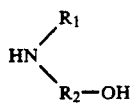

where $R_1$ is a hydrogen atom or a $-CH_3$, $-C_2H_5$, $-C_3H_7$, $-C_4H_9$, $-C_2H_4-OH$, $-C_3H_6OH$,

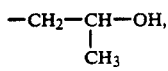

$C_4H_8-OH$ or

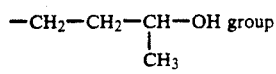 group and $R_2$ is a bivalent ethylene, propylene, isopropylene, butylene or isobutylene radical.

Examples of alkanolamines corresponding to general formula (I) and usable for the purposes of the present invention are monoethanolamine, diethanolamine, monoisopropanolamine, diisopropanolamine, mono-sec-butanolamine, di-sec-butanolamine, 2-amino-2-methyl-1-propanol, N-methylethanolamine and N-butylethanolamine. Said compounds are completely soluble in water and ethanol and have a boiling point $>100°$ C.

The term "silica alcogel" means a silica gel prepared by the known sol-gel method and washed with alcohol, preferably ethyl alcohol. Specifically, the alcogel used to illustrate the present invention was prepared by the method described in Italian patent application 20126 A/90 filed in the name of the present applicant on Apr. 24, 1990.

The emulsion technique described in numerous patents such U.S. Pat. No. 4,089,932, U.S. Pat. No. 4,104,363, EP 0280683 and EP 0362962 was used to obtain silica xerogels with spherical morphology and controlled dimensions, suitable for use in the catalysis, absorption and other fields.

DESCRIPTION OF THE PREFERRED EMBODIMENT

Figure 1:
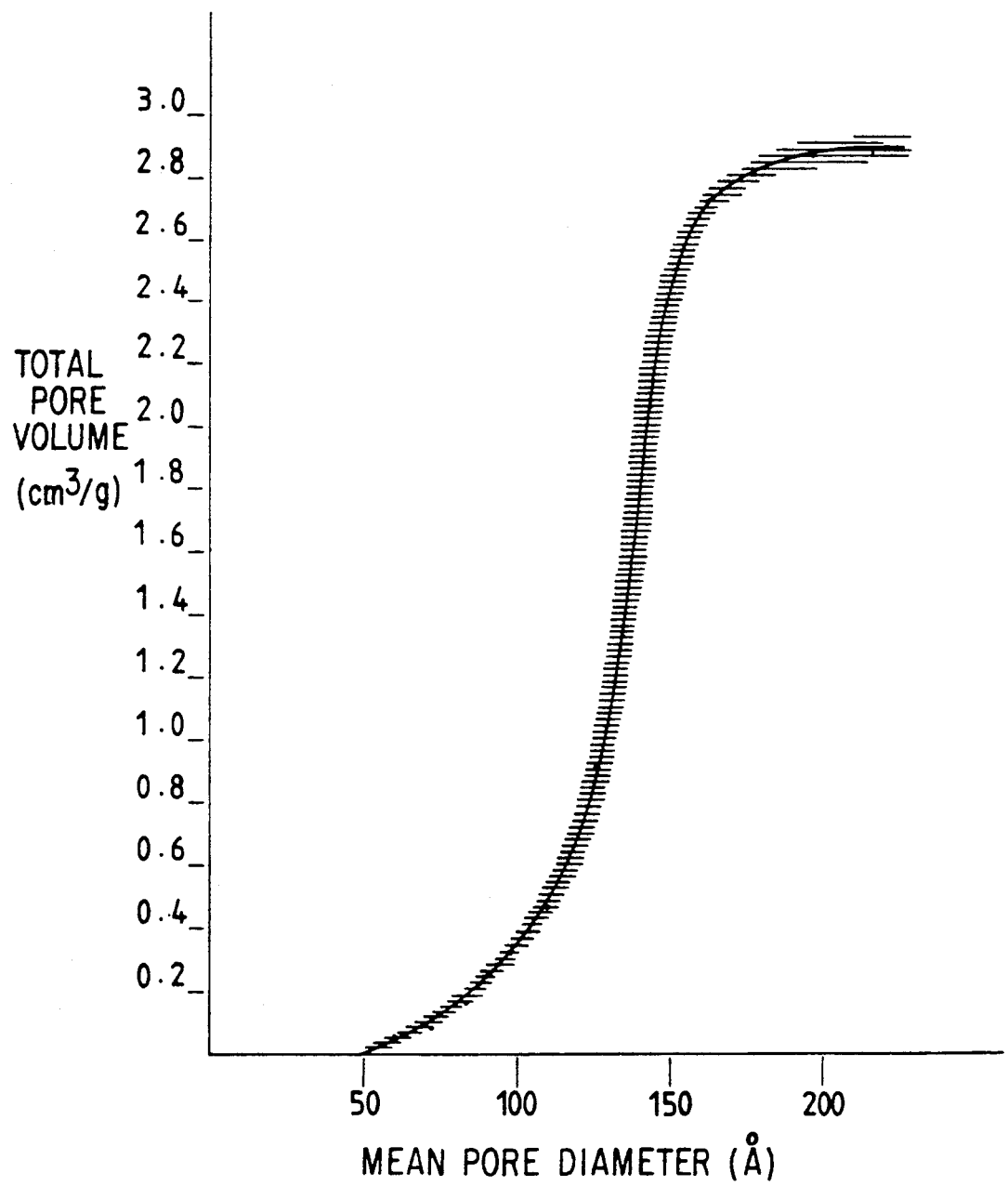
FIG. 1 shows the pore size distribution of the silica xerogel produced by the present invention.

In the first stage of the process of the present invention the alkanolamines (I) of the present invention are mixed with the silica alcogel in such a quantity that after removing the alcohol the silica is completely immersed in the liquid. The organic compound/silica weight ratio is normally greater than 3.

The silica concentration in the alcogel is not critical and can vary for example from 30 to 100 g/l. With alcogels prepared by the known process the silica concentration normally varies from 50 to 80 g/l. The alcohol present in the alcogel is ethanol, but other alcohols with a boiling point $<100°$ C. can be used, such as methanol, propanol and isopropanol.

Higher alcohols such as octanol and decanol negatively affect the xerogel characteristics.

Of the alkanolamines of the present invention, monoethanolamine $H_2N-C_2H_5OH$ and diethanolamine $HN-(C_2H_5OH)_2$ are preferably used.

Of these, monoethanolamine is preferred as it enables xerogels to be obtained with a high pore volume (2-3 cc/g) by operating the thermal treatment of the 2nd stage at a temperature less than or equal to 130° C.

The alcogel is mixed with the alkanolamines (I) under mechanical agitation at ambient temperature. If solid alkanolamines such as diethanolamine (M.P. 28° C.) are used, the solid can either be added directly to the alcogel in which it dissolves, or be added in its molten state. To ensure that the organic compound penetrates into the pores of the silica gel, the product is left in contact with the liquid for a time which can vary from a few minutes to some hours, depending on the characteristics of the alcoholic solution of the alkanolamine such as viscosity, or on the characteristics of the silica alcogel such as its pore size, or finally on the mixing method used, such as mechanical agitation or ultrasound dispersion.

Before subjecting the product to thermal ageing, the alcohol is removed by distillation (2nd stage). This can be conducted either at atmospheric pressure or under vacuum. In this latter case the vacuum and temperature conditions are controlled such as to prevent distillation of the alkanolamine. For example, if monoethanolamine is used, the alcohol can be distilled at 25°-30° C. under a vacuum of 80 mmHg. To ensure complete elimination of the alcohol, the temperature of the silica-alkanolamine dispersion is raised to 90°-100° C. at atmospheric pressure, or if operating under vacuum to a temperature such as to prevent distillation of the alkanolamine. For example if using monoethanolamine under the aforesaid vacuum conditions (80 mmHg) the temperature can be raised to 55°-60° C., and if using diethanolamine the temperature can be raised to 95° C.

The time for which the product remains at said temperatures is normally 15-30 minutes.

After removing the alcohol, the product (B) obtained is subjected to thermal treatment at a temperature of between 100° C. and 250° C. (3rd stage). This treatment is conducted at atmospheric pressure under static conditions or under mild mechanical agitation in a closed reactor or a reactor lightly purged with inert gas to prevent degradation of the alkanolamine. The thermal treatment temperature and time are regulated according to the type of alkanolamine used and the desired characteristics (surface area, pore volume and diameter).

Specifically, if monoethanolamine is used the operating temperature range is 100°-150° C. and preferably 120°-140° C. with an ageing time variable between 2 and 24 hours; if diethanolamine is used the temperature can vary from 130° to 200° C. and preferably between 130° and 160° C. with an ageing time variable between 2 and 24 hours.

When operating under these conditions, xerogels are obtained which after calcining at 500° C. have a surface area variable from 600 to 1000 m²/g, a pore volume variable from 2 to 3 cc/g and a pore diameter variable from 100 to 300 Å.

As a result of thermal treatment in the presence of alkanolamines, esterification reactions occur between the silanol groups (Si-OH) of the silica and the alcohol groups of the alkanolamines, as is demonstrated by I.R. spectra analysis conducted on the xerogels.

Compared with compounds known in the literature (such as polyfunctional alcohols) the compounds of the invention in which a basic function (amine) is associated with a hydroxyl function enable higher porosity levels to be attained, comparable with those achieved under hypercritical drying conditions (2.5-3 cc/g). Monoethanolamine has been found to be particularly active in producing xerogels with high porosity. Even at a temperature of 100° C. and with an ageing time $\geq 5$ h it produces xerogels with a pore volume >2.0 cc/g.

On termination of thermal treatment the product is separated from the alkanolamine, for example by filtration, and washed repeatedly with alcohol, preferably ethanol (stage 4).

The product is then dried (stage 5). The wash solvent removal conditions are not critical. It can be removed for example under vacuum at a temperature of 30°-40° C. or at atmospheric pressure.

The xerogel when dried at 40° C. under vacuum has an N content variable from 0.4 to 1.5 wt. %, referred to 100 g of $SiO_2$.

To remove the organic residue the xerogel is finally calcined in an oxidizing atmosphere, for example in air, at a temperature $\geq 400°$ C. (stage 6). This operation is conducted under controlled conditions. To facilitate gradual decomposition of the organic residue the rate of heating to the temperature $\geq 400°$ is maintained $\leq 200°$ C./h and preferably between 50 and 100° C./h. The calcining temperature must be $\geq 400°$ C. to ensure complete removal of the organic compound, and is preferably $\geq 500°$ C. The time for which the product remains at this temperature can vary from 1 to 20 hours.

To evaluate the characteristics of the xerogels obtained using the process of the invention, the products were calcined at 500° C. with a heating rate of 50° C./h.

In terms of total pore volume, the xerogels obtained using the described process are comparable with the respective products (aerogels) dried under hypercritical conditions in ethyl alcohol.

In this respect, the xerogels obtained using the described process consist of powdered $SiO_2$ of spherical morphology, characterised by a surface area variable from 400 to 1000 m²/g, a total pore volume variable from 2 to 3 cc/g and a mean diameter variable from 100 to 300 Å.

The process of the present invention not only enables the pore diameter to be regulated within the range of 100-300 Å but also enables the pore diameter distribution to be controlled. In this respect, the xerogels of the present invention have a narrow pore diameter distribution, in that at least 80% of he total pore volume lies within the diamter range of 100-300 Å. FIG. 1 shows a typical pore diameter distribution curve for the xerogels of the invention.

In said figure the horizontal axis represents the mean pore diameter (expressed in angstroms Å) of the xerogels obtained by the process of the present invention, and the vertical axis represents the total pore volume expressed as cm³ per gram of xerogel (cm³/g).

The xerogels of the invention are described in terms of pore volume (V), surface area (S) and mean pore diameter (D). The surface area was determined by the BET (Branauer, Emmet and Teller) method, and the pore volume by the BJH (Barret, Joiner and Hallenda) method, both known in the art. The mean pore diameter (expressed in Å) was determined by the following known relationship:

$$D(Å) = \frac{4V(cc/g)}{S(m^2/g)} \times 10^4$$

The xerogels produced in accordance with the present invention are mainly used as a support for catalyst and/or other metal systems. They can however also be used as reinforcing agents, thickeners, thixotropic agents in pigments or paints, thermal and/or sound insulation etc.

The following examples are given to illustrate the present invention but without being limitative thereof.

EXAMPLE 1

A) Preparation of the Silica Alcogel 100 ml of TEOS (tetraethylorthosilicate) and 1120 ml of 0.01N HCl are maintained under mechanical agitation for the time, about 30 minutes, necessary to obtain a single-phase solution, the temperature being controlled by an external cooling bath such that it reaches but does not exceed 30° C.

The clear solution is maintained under agitation at ambient temperature for a further 60 minutes, after which it is stored at 5° C. until the moment of use.

170 ml of this solution are heated to 20° C. Under mechanical stirring the solution pH is then adjusted from 2.2 to 6.0 by adding 0.1M $NH_4OH$ dropwise.

The colloidal silica solution obtained as heretofore described is rapidly poured into 580 ml of toluene in which 8.8 g of SPAN 80 emulsifier (sorbitan monooleate) is dissolved. Agitation is then applied by an "Ultraturrax T50" emulsifying machine at a speed of 3000 r.p.m.

The emulsion which forms consists of silica sol droplets which after about 4 minutes become spherical gel particles. After this time period the agitation is halted. The product is maintained in contact with the liquid for a further 10 minutes and is then filtered under vacuum taking care that the panel remains soaked in solvent. The filter cake is then dispersed under mild mechanical agitation in absolute ethyl alcohol (total volume 800 ml) and again filtered. The dispersion-filtration procedure is repeated a further two times.

Finally, the cake is again redispersed in absolute ethyl alcohol (total volume 800 ml) and then subjected to disaggregation by the "Ultraturrax T50" (3000 r.p.m. for 60 seconds).

After the product has sedimented, about 500 ml of ethyl alcohol are poured off. The $SiO_2$ concentration in the residual alcogel is 60 g/l.

By means of the aforesaid procedure, a stock of 2800 ml of alcogel containing 60 g/l of silica was prepared by mixing individual batches.

B) Preparation of the Silica Xerogel 260 g of $SiO_2$ alcogel, corresponding to 20 g of $SiO_2$, are mixed with 400 g of monoethanolamine (RPE C. Erba) under mechanical agitation for 15 minutes. The mixture is left standing for 21 h and is then distilled in a Rotavapor under reduced pressure (about 80 mmHg vacuum) in a bath temperature-controlled at 35° C.

After 50 minutes the bath temperature is raised firstly to 50° C. and then to 60° C., the product being maintained at these temperatures for 40 minutes and 30 minutes respectively.

100 g of the mixture are placed in a closed vessel and subjected in a temperature-controlled bath to thermal ageing at 130° C. for 5 h. After this period the mixture is allowed to cool to ambient temperature. The product which deposits on the bottom of the vessel is separated from the excess monoethanolamine and then dispersed in 300 ml of absolute ethyl alcohol under mechanical agitation.

The product is filtered and washed with absolute ethyl alcohol to remove the free monoethanolamine. It is then dried under vacuum (80 mmHg) at a temperature of 35° C.

On chemical analysis the nitrogen content of the dried xerogel was found to be 0.73 wt % on the $SiO_2$.

The product is finally calcined in air under static conditions at a temperature of 500° C. for 10 h, the heating rate being controlled at 50° C./h.

The xerogel has the following characteristics: specific surface 636 $m^2/g$; total pore volume 2.83 cc/g; mean pore diameter 178 Å. 83% of the total volume consists of pores with a diameter within the range 178±25% Å.

The xerogel obtained under the described conditions consisted of spherical particles of $SiO_2$ with a mean diameter ($\approx 60$ μm) of about 1.6 times greater than that of $SiO_2$ particles not subjected to thermal ageing of monoethanolamine.

EXAMPLE 2

Example 1 is repeated, using diethanolamine (RPE C. Erba) instead of monoethanolamine.

260 g of silica alcogel, corresponding to 20 g of silica, are mixed with 400 g of liquid diethanolamine at a temperature of 30° C. After allowing the mixture to stand for 18 h at ambient temperature, the ethyl alcohol is distilled under vacuum (80 mmHg) at a temperature of 35° C. for 50 minutes. The temperature of the heating bath is gradually raised firstly to 50° C. and then to 95° C., the product being maintained at these temperatures for 30 minutes and 15 minutes respectively.

121 g of the mixture are heated to 130° C. for 5 hours. When separated, washed and dried under the conditions described in Example 1, the product showed a N content of 0.98 wt % on the $SiO_2$.

After calcining at 500° C., the xerogel had the following characteristics: specific surface 866 $m^2/g$; total pore volume 2.71 cc/g; mean pore diameter 125 Å.

84% of the total volume consisted of pores with a diameter within the range 125±25% Å.

EXAMPLES 3-4

By way of comparison, ethylene glycol (RPE C. Erba) and polyethyleneglycol 400 (Merck) were used instead of the organic compounds of the invention. The procedure of Example 2 was followed, with ageing at 130° C. for 5 h, to give silica xerogels with the characteristics shown in Table 1.

TABLE

| Example | Compound | Specific surface ($m^2/g$) | Total pore volume (cc/g) | Mean pore diameter (Å) |
|---|---|---|---|---|
| 3 | Ethylene glycol | 921 | 2.07 | 90 |
| 4 | Polyethyleneglycol 400 | 660 | 0.54 | 32 |

The total pore volume was 30% less (Example 3) than that of xerogels obtained with the compounds of the invention.

EXAMPLES 5-20

Examples 1, 2, 3 and 4 were repeated at various temperatures and with various ageing times. The characteristics of the xerogels obtained are shown in Table 2.

For equal operating conditions the mono and diethanolamine provide xerogels characterised by a total pore volume greater than that of organic compounds containing only the hydroxyl group. Using diethanolamine (Example 10), a value of about 3 cc/g is obtained.

The xerogel is characterised by a narrow pore diameter distribution as shown in FIG. 1. The porosity of this sample is comparable with that of the corresponding product when dried under hypercritical conditions.

EXAMPLE 21

By way of comparison, the silica alcogel was dried under hypercritical conditions by the procedure described in Italian patent application 20126 A/90.

After calcining under the conditions of Example 1, the aerogel showed the following characteristics: specific surface 448 $m^2/g$; total pore volume 2.89 cc/g; mean pore diameter 258 Å.

The products of the invention have a total pore volume comparable with that of the aerogel.

TABLE 2

| Ex. | Compound | Thermal treatment T (°C.) | t (h) | S.S. ($m^2/g$) | V (cc/g) | D (Å) | % V pores with diam. D ± 25% |
|---|---|---|---|---|---|---|---|
| 5 | monoethanolamine | 100 | 5 | 805 | 2.20 | 109 | 81.3 |
| (6) | " | 100 | 24 | 714 | 2.56 | 143 | 80 |
| (7) | " | 130 | 24 | 535 | 2.89 | 216 | 81 |
| 8 | diethanolamine | 100 | 24 | 925 | 2.65 | 114 | 84 |
| 9 | " | 130 | 24 | 780 | 2.89 | 148 | 88 |
| (10) | " | 160 | 5 | 836 | 2.94 | 141 | 85 |
| 11 | " | 160 | 24 | 681 | 2.97 | 174 | 90 |
| 12 | " | 200 | 5 | 602 | 1.98 | 131 | 89 |
| 13 | ethylene glycol | 100 | 24 | 898 | 1.60 | 71 | 73 |
| 14 | " | 130 | 24 | 868 | 2.56 | 118 | 85 |
| 15 | " | 160 | 5 | 862 | 2.56 | 120 | 82 |
| 16 | " | 160 | 24 | 737 | 2.68 | 145 | 86 |
| 17 | polyethyleneglycol 400 | 130 | 24 | 777 | 0.86 | 44 | 73 |
| 18 | " | 160 | 5 | 769 | 1.19 | 62 | 73 |
| 19 | " | 160 | 24 | 836 | 2.29 | 110 | 78 |
| 20 | " | 200 | 5 | 774 | 2.48 | 128 | 79 |

We claim:

1. A process for preparing silica xerogels from alcogels, consisting of the following stages:

1) mixing a silica alcogel with at least one organic compound (I) to obtain an SiO₂-alcohol-(I) mixture (A);
2) removing the alcohol by distillation to obtain an SiO₂—I mixture (B);
3) thermal treatment at a temperature between 100° and 250° C. to obtain an SiO₂—I mixture (C) in which the hydroxyl groups of some molecules of (I) are esterified with the silanol groups (Si—OH) of the silica;
4) separating a large part of the organic compound (I) which has not reacted during the thermal treatment of stage 3), by filtration and repeated washing with an alcohol to obtain a xerogel (D) containing the molecules of (I) esterified during stage 3) plus that part of the wash alcohol which had remained adsorbed;
5) drying the product (D) from stage 4) to obtain a xerogel (D) free of adsorbed alcohol;
6) calcining the xerogel (D) from stage 5) in an oxidizing atmosphere at a temperature of between 400° and 600° C., the process being characterised in that the organic compound (I) consists of an alkanolamine pertaining to the group of general formula:

where $R_1$ is a hydrogen atom or a —CH₃, —C₂H₅, —C₃H₇, —C₄H₉, —C₂H₄—OH, —C₃H₆OH,

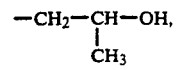

C₄H₈—OH or

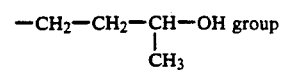

and $R_2$ is a bivalent ethylene, propylene, isopropylene, butylene or isobutylene radical.

2. A process as claimed in claim 1, characterised in that the alkanolamines corresponding to general formula (I) and usable for the purposes of the present invention are monoethanolamine, diethanolamine, monoisopropanolamine, diisopropanolamine, mono-sec-butanolamine, di-sec-butanolamine, 2-amino-2-methyl-1-propanol, N-methylethanolamine and N-butylethanolamine.

3. A process as claimed in claim 2, characterised in that the alkanolamines usable are monoethanolamine and diethanolamine.

4. A process as claimed in claim 1, characterised in that the thermal treatment of the mixture B of the third stage is conducted at atmospheric pressure and at a temperature of between 100° and 250° C.

5. A process as claimed in claim 4, characterised in that the thermal treatment is conducted at a temperature of between 100° and 160° C.

6. A process as claimed in claim 1, characterised in that the calcining temperature during the sixth stage is between 500° and 800° C.

* * * * *